Figure 1:
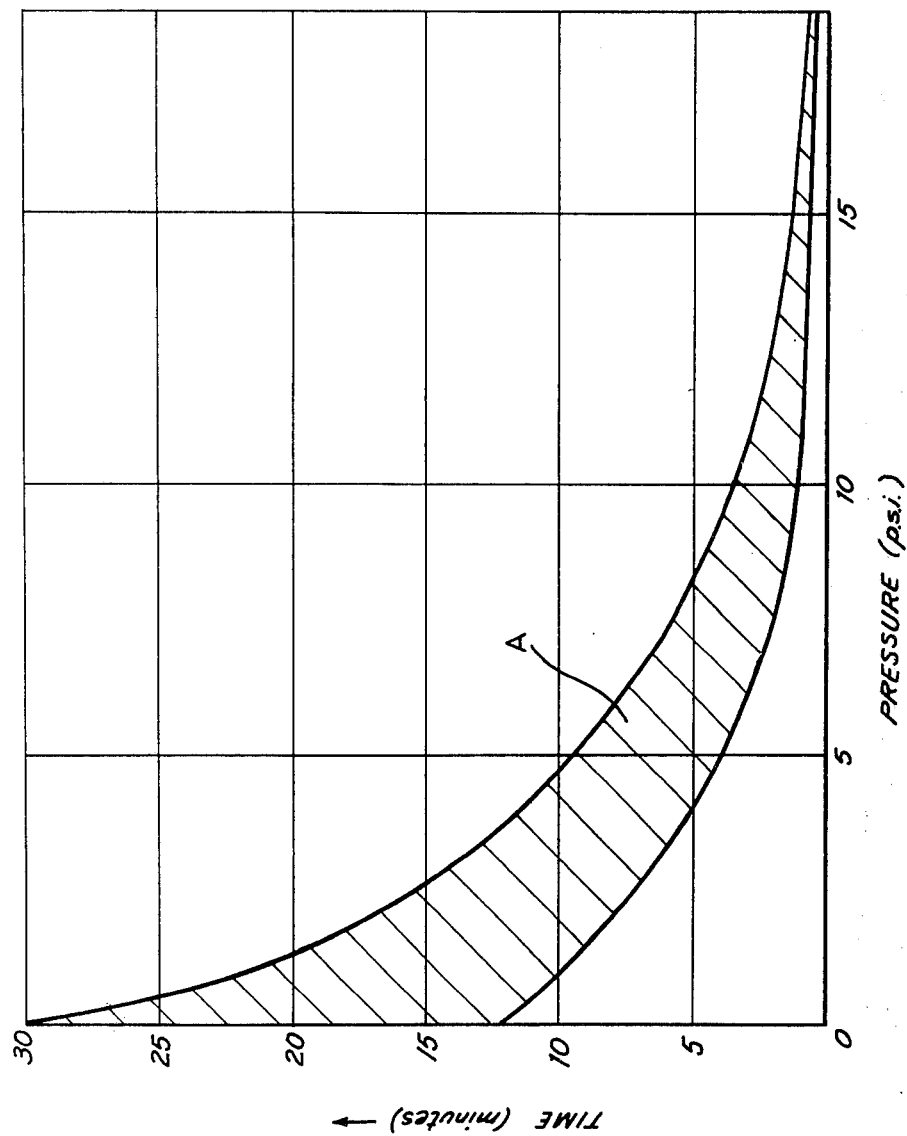

United States Patent [19]

Comer

[11] 4,022,919

[45] May 10, 1977

[54] REMOVAL OF BITTER FLAVOR FROM PEA FLOUR

[75] Inventor: Frederick William Comer, Agincourt, Canada

[73] Assignee: The Griffith Laboratories, Limited, Scarborough, Canada

[22] Filed: Nov. 3, 1975

[21] Appl. No.: 628,577

Related U.S. Application Data

[63] Continuation-in-part of Ser. No. 549,870, Feb. 14, 1975, abandoned.

[52] U.S. Cl. .................................. 426/511; 426/634
[51] Int. Cl.² ............................................ A23L 1/20
[58] Field of Search .......... 426/443, 463, 468, 425, 426/511, 622, 627, 634

[56] References Cited

UNITED STATES PATENTS

| | | |
|---|---|---|
| 2,162,729 | 6/1939 | Levinson et al. .................. 426/468 |
| 3,642,490 | 2/1972 | Hawley et al. ..................... 426/511 |
| 3,865,956 | 2/1975 | Fukushima et al. ................ 426/468 |

*Primary Examiner*—A. Louis Monacell
*Assistant Examiner*—C. A. Fan
*Attorney, Agent, or Firm*—Fetherstonhaugh & Co.

[57] ABSTRACT

A method of removing bitter flavor and pea flavor from a pea flour for addition to food systems comprising the steps of contacting the flour with steam for a time duration sufficient to debitter the pea flavor and cause the steam to take up volatiles and then leading off the steam and volatiles before a substantial cooked pea flavor develops.

7 Claims, 1 Drawing Figure

REMOVAL OF BITTER FLAVOR FROM PEA FLOUR

This is a continuation-in-part application of application Ser. No. 549,870 filed Feb. 14, 1975, now abandoned.

This invention relates to removing bitter flavour and pea flavour from a pea flour.

Pea flours are an excellent source of vegetable protein. They are made by grinding dried peas. The starchy components can be separated to leave a flour that is higher in protein content. For the purposes of this invention pea flour includes whole pea flour and higher protein pea flours prepared by a process that removes some starch components. Pea flours tend, however, to have a bitter taste and a characteristic pea flavour which are objectionable if they are to be mixed with other foods.

It one can efficiently remove the bitter taste and pea flavour the utility of pea flour is greatly increased. So treated, it would have extensive use as an additive to other food products to increase their protein content and as a whole food. For example, vegetable protein concentrates, made from soy bean, are useful as meat extenders. They can be added to meat products to supplement the protein content and increase food value. The cost of vegetable protein is substantially less than meat protein and the economics of the mixture will be readily apparent.

To be useful in food systems, the removal of the bitter characteristic and the pea flavour must, however, be done in such a manner that the end product possesses desirable functional properties. Two desirable functional properties of vegetable proteins in food systems are their water binding and emulsification capacities.

The water binding capacities of vegetable proteins can be determined directly using a method such as the hydration capacity method of the American Association of Cereal Chemists (AACC method 56-20). The emulsification properties of vegetable proteins are complex and are influenced by the other components in the food system. It is well-known, however, that the protein must not be substantially denatured if it is to be capable of interacting with other components in a food system in the formation and stabilization of emulsions. Therefore, high protein solubility of vegetable protein concentrates is necessary for good emulsification properties. A generally accepted method for the determination of protein solubility is the nitrogen solubility index (N.S.I.) method of the American Association of Cereal Chemists (AACC method 46-23). Undenatured pea flour has a high N.S.I.

Moist steam has been used in the processing of protein flours. It has, for example, been used in the processing of soya bean flour. In the processing of soya bean flour it is common to extract the oil with a solvent to increase the protein content and then treat the remaining meal and solvent with steam. The steam is used primarily to remove the solvent. The effects of the application of steam to soya bean meal have been the subject matter of considerable previous study and they are well known. One of the known effects is that it denatures the product to a point where its nitrogen solubility index is reduced so that it is not useful for further processing in many human food systems. It has a low emulsification ability. Most of the product treated in this way is used for animal feed because of its low nitrogen solubility index.

Pea flour is of a somewhat different nature to soya bean flour, in that there is no oil that must be removed. It does, however, have the bitter characteristic that must be removed before it can be usefully used in a human food system. It also has a pea flavour characteristic that is objectionable in some food systems.

It is an object of this invention to provide a simple method for debittering pea flours so that it can be incorporated into human food systems. It is also an object of the invention to remove the characteristic pea flavour of pea flours.

It has been found that one can satisfactorily debitter a pea flour and at the same time remove most of the pea flavour for subsequent use in a human food system.

A method of removing bitter flavour and pea flavour from a pea flour for addition to food systems, according to this invention, comprises the steps of contacting the flour with steam for a time duration sufficient to debitter the pea flour and cause the steam to take up volatiles and then leading off the steam and volatiles before a substantial cooked pea flavour develops. The invention will be clearly understood after reading the following detailed specification.

In the drawings:

FIG. 1 is a graph illustrating the range of steam pressures and temperatures to which pea flour can be subjected to debittering in an autoclave in accordance with this invention.

As indicated in the preamble to this application, the invention is concerned with the debittering and deflavouring of a pea flour. Pea flours are manufactured by grinding dried peas and then in the case of protein concentrates of pea flour separating the ground product to achieve a product with a higher protein content. The manufacture of high protein vegetable flours is well known. Generally speaking, the dried vegetable, bean or pea, is ground into a fine powder and then separated by air-classification to achieve a concentration of particles having a size with a high protein content and particles having a low protein content. Whole peas have a protein content of about 24 percent. The pea flour will have a protein content in excess of this amount and levels of 60 percent protein are readily achieved by air-classification.

The flour, as manufactured, has a bitter taste. It also has an objectionable pea flavour. If the concentrate is to be mixed with other protein food products to increase their protein content, it must be debittered and the objectionable pea flavour must be removed. This invention removes bitter taste and, at the same time, removes pea flavour.

In a preferred embodiment of the invention, the pea flour is placed on a tray to a thickness of about one inch and then placed in an autoclave and subjected to a low temperature steam for a short period of time. It has been found that the application of saturated steam at atmospheric pressure for a period of between 12 and 30 minutes satisfactorily debitters the pea flour. Other satisfactory conditions for debittering are steam at about 5 p.s.i. between 3 and 9 minutes. FIG. 1 is a graph illustrating these and other conditions of temperature and pressure, for pressures up to 18 p.s.i. in the autoclave, for preferred treatment of dry pea flour in accordance with the invention. The area marked A represents conditions of application for moist heat to achieve a satisfactorily debittered product. It is apparent that at pressures above 18 p.s.i. the time for proper treatment is very short. A pea flour debittered within the conditions marked in the area A is satisfactorily debittered without reducing the nitrogen solubility index to a level where it is not useful in food systems. The lower line of this graph represents the minimum conditions necessary to debitter and minimize the pea flavour. Under these conditions pea flour solubility is reduced only slightly from an N.S.I. of 70 to an N.S.I. of not less than 50. The upper curve represents the maximum conditions tolerated which will not result in any further significant reductions in the nitrogen solubility index. The conditions defined by the area A, and its extrapolation to the right, therefore, characterize the production of debittered and deflavoured pea flour with an acceptable protein denaturation, i.e. N.S.I. 50 – 70.

Typical pea flour, at the beginning of the autoclave process, has a moisture content of about five percent. Moisture contents in the order of less than 10 percent will be most common, but it is contemplated that treatment of pea protein flour is practical with moisture contents to 25 percent. As the moisture content of the flour increases, the orange-brown colour of the resulting product increases. High colour is an objectionable feature of a protein flour for many uses. For example, protein flours are used as meat extenders and a high orange-brown colour in the extender could be objectionable from an appearance point of view. Excessive application of steam also causes a cooked pea flavour in the resulting product which is objectionable.

FIG. 1 used saturated steam. The steam is preferably saturated but it will be appreciated that variations to achieve the equivalent of FIG. 1 may be possible within the scope of the invention. Lower amounts of steam are possible as long as moist heat conditions are maintained. A given quality of steam must be applied long enough to remove the bitter flavour and the pea flavour but not so long that a cooked pea flavour develops in the product.

A steam pressure of about 0 p.s.i. is preferred because, as appeares from FIG. 1, the process can be carried out over a wider range of time at this pressure.

Following is a table of typical pea flour treatment results obtained by contacting a 60 percent protein pea flour in an autoclave.

TABLE ONE

| Test No. | Temp. °C | Steam Pressure p.s.i. | Time Min. | AACC NSI pH = 6.3 % | AACC Hydration Capacity % | Flavour |
|---|---|---|---|---|---|---|
| | — | — | — | 76 | 190 | bitter, pea |
| 1 | 100 | 0 | 10 | 65 | 237 | slight bitter, slight pea |
| 2 | 100 | 0 | 15 | 60 | 243 | no bitter, very slight pea |
| 3 | 100 | 0 | 30 | 59 | 280 | no bitter, very slight pea |
| 4 | 100 | 0 | 40 | 49 | 291 | no bitter very slight pea |
| 5 | 108 | 5 | 2 | 65 | 221 | bitter, very slight pea |
| 6 | 108 | 5 | 5 | 59 | 230 | no bitter, very slight pea |
| 7 | 108 | 5 | 7.5 | 61 | 271 | no bitter, very slight pea |
| 8 | 108 | 5 | 10 | 52 | 302 | no bitter, very slight pea |
| 9 | 116 | 10 | 2 | 60 | 237 | no bitter, very slight pea |
| 10 | 116 | 10 | 5 | 55 | 246 | no bitter, very slight pea |
| 11 | 116 | 10 | 10 | 45 | 253 | no bitter, slight cooked pea |
| 12 | 116 | 10 | 20 | 37 | 322 | no bitter, slight cooked pea |
| 13 | 121 | 15 | 1 | 59 | 265 | no bitter very slight pea |
| 14 | 121 | 15 | 2.5 | 50 | 271 | no bitter very slight pea |
| 15 | 121 | 15 | 5 | 40 | 291 | no bitter slight cooked pea |
| 16 | 116 | 10 | 30 | 20 | 260 | no bitter, slight cooked pea |

It will be noted that a sample treated with saturated steam at zero p.s.i. and 100° C. for 15 minutes had no bitter flavour. It did have a slight pea flavour and a nitrogen solubility index of 60. An N.S.I. value of over 25 is desirable. Thus, this product is a very satisfactory product. The slight pea flavour is not objectionable and this product can be readily used in food systems without detection of a pea flavour.

As processing time and/or steam pressure increases, the N.S.I. is further reduced. Product treated to reduce N.S.I. to 45 had a slight cooked pea taste that is undesirable. Product with an N.S.I. of 76 was bitter. A desirable application of steam to dry pea flour is one that reduces N.S.I. to between 70 and 50.

It will be noted that as steam treatment of the pea flour increases and N.S.I. is decreased the residual pea flavour is reduced to a minimum. As steam treatment is continued after a minimum residual pea flavour is reached, a cooked pea flavour develops. The development of a cooked pea flavour beyond a certain point can be a condition that limits the application of steam for a satisfactory product. Thus, test No. 15 has an N.S.I. of 40 which, under some conditions, might be satisfactory for a pea flour for use in food systems. It also has a slight cooked pea flavour that made it objectionable. Similarly tests 11 and 12 had a slight cooked pea flavour that made them objectionable. A cooked pea flavour that is objectionable is to an extent a subjective consideration but in practice it will readily be determined. It is not intended to claim within the scope of this invention heat treatments that develop substantial cooked pea flavour that is objectionable.

The debittering or removal of the bitter flavour is thought to be a chemical reaction that takes place during the moist heat treatment caused by the steam. The pea flavour that is also removed by steam application is thought to be carried away with the steam volatiles as they circulate through the autoclave. While it has been found satisfactory to arrange the pea flour on a tray to a thickness of about one inch, it will be apparent that the thickness is determined to achieve heat and moisture penetration in a given case and that it is a matter of adjustment by the operator. Vibration of the tray or other means of agitating the flour, e.g. tumbling, could improve penetration efficiency. Equipment other than an autoclave may well be used to apply moist heat to the pea flour. Moreover, less than saturated steam would most likely achieve a good result, but would require more time. It is intended that variations in steam condition from saturated as indicated in FIG. 1 with appropriate variations of time to achieve removal of bitter flavour and pea flavour without introducing a substantial cooked pea flavour should be considered within the scope of this invention. It is also intended that variations in the mixing of the steam with the pea protein by physical or mechanical means with appropriate variations of time to achieve a similar result should be considered within the scope of this invention.

The foregoing experiments described in this invention concerned the debittering and deflavouring of pea flours by treatment of the dry or partially hydrated solid material with steam. It has also been found that aqueous slurry of pea flours can be debittered and the pea flavour removed by injecting steam. A simple apparatus known as a jet cooker has been found suitable for the debittering and deflavouring of aqueous slurry of pea flour. This apparatus is well-known in food processing industries and is conventionally used for sterilization purposes. It consists of two feed pipes, one for the aqueous slurry and the other for steam; a mixing chamber where the steam disperses in and heats up the aqueous slurry, and finally an exit tube where the heated slurry leaves the chamber. It is believed that the debittering and deflavouring of pea flour in such an apparatus occurs by the same mechanisms which operate when the dry material is treated with steam, i.e. the debittering occurs by some chemical reaction during the heat treatment whereas the pea flavours are carried away with the steam volatiles. When an aqueous slurry of pea flour is treated with steam in a jet cooker the flashing off of the pea flavours with the steam as it leaves the exit tube is particularly effective. Subsequent removal of water by spray drying or ring drying produces a bland product devoid of any bitter or vegetable flavours. Other drying methods could be used.

In a jet cooker the aqueous slurry is subjected to steam treatment for a very short time, generally of the order of one to ten seconds. Sufficient steam pressure is used to raise the temperature of the aqueous slurry above 100° C and preferably to temperatures above 120° C. At these elevated temperatures more protein denaturation occurs than in the treatment of dry pea flour but the extra denaturing is compensated for by another acquired characteristic of the slurry treated product. It has an increased hydration capacity.

By way of example, in experiment No. 17 a slurry of 35 pounds of a 60% protein pea flour in 65 pounds of cold water was steam treated in a small jet cooker having an exit tube one inch I.D. and 10 feet in length. The exit valve was adjusted such that a slurry temperature of 165° C was reached. The products of this treatment had no bitter flavour, no pea flavours and no cooked pea flavour and was in the form of a cream coloured gel. A cream coloured powder was obtained by spray drying a homogenized slurry of the gel in hot water.

In experiment No. 18 a water slurry of 60% pea flour was steam treated as described in experiment No. 17 except that the slurry pH was adjusted with hydrochloric acid to 4.3 prior to steam treatment and then neutralized with sodium hydroxide to pH 6.7 after the steam treatment.

When aqueous slurries of pea flours are treated in a jet cooker to temperatures above 120° C the solubility of the protein in water is significantly reduced such that the recovered dried products have N.S.I. values below 50%. However, as above indicated, these debittered and deflavoured products have unique functional properties which are very useful in food systems. Following is a comparison of certain functional properties of a 60% protein pea flour treated in various ways.

TABLE TWO

|  | Colour | Flavour | AACC N.S.I. % | AACC Hydration Capacity % |
|---|---|---|---|---|
| Untreated | cream | Bitter, pea | 76 | 190 |
| Steam treated (Exp. 2) | tan | Very slight pea | 60 | 243 |
| Jet cooked (Exp. 17) | cream | Bland | 28 | 542 |
| Jet cooked (Exp. 18) | cream | Bland | 30 | 522 |
| Roller-dried | light brown | Cooked pea | 30 | 310 |

Table two summarizes several of the properties of the products treated according to this invention and also includes data for a pea flour debittered by a conventional roller drying process of an aqueous slurry. During roller drying the solution or slurry is heated on large rollers or drums. In drying the solids will generally reach temperatures of 100° C or more. These conditions lead to protein denaturation. Although this heat treatment successfully debitters the pea flour it does not remove the pea flavour. This is probably because during the heating of the slurry on the rolls insufficient steam is generated to carry away the pea flavours. The pea flavours remained trapped within the aqueous slurry and in addition cooked pea flavours develop. By contrast, product made with jet-cooking of a pea flour slurry or steam treatment of the dry pea flour had no objectionable pea flavour and no cooked pea taste.

Another undesirable property which occurs during roller drying of pea flour slurries is the development of brown colouration. This phenomenon was observed, although to a far less extent, during the steam treatment of dry pea flours. It was also observed that the brown colouration intensified when the dry materials were partially hydrated prior to steam treatment. For some unexplained reason the brown colouration does not occur during the jet cooking of aqueous slurries of pea flours.

A most surprising and extremely useful result from the jet cooking treatment of a pea flour aqueous slurry is the great enhancement of the water binding capacity in the recovered pea product as indicated in the graph by hydration capacity. It is known that heat treatment can often improve the water binding capacity of vegetable proteins but the observed enhancement in the pea protein concentrate deflavoured by the jet-cooking process is very much greater than expected. This is revealed in Table Two from a comparison of the hydration capacities for jet-cooked and roller-dried pea flours which have the same N.S.I. The usefulness of a debittered and deflavoured pea flour with excellent water binding capacity is readily apparent. Although the deflavoured products from experiments 17 and 18 would be expected to have lower emulsification capacities than the deflavoured product from experiment 2 their lower protein solubilities are compensated for by their superior water binding capacities to the extent that all three products perform very satisfactorily in extending meat products.

The exact nature of the reactions responsible for the improved water binding properties are not known. It is believed, however, that hydrolytic chemical reactions are occurring during the steam treatment of aqueous slurries of pea flour in a jet cooker.

To summarize, it has been found that in pea flours bitter flavour and pea flavour can be removed by steam treatment without incurring a cooked flavour to yield products with desirable functional properties in food systems. Dry and partially hydrated pea flours can be treated with a moderate improvement in water binding properties and with only a small decrease in protein solubility. An aqueous slurry of pea flour can be treated without browning to yield products with excellent water binding capacity, moderate protein solubility and excellent dispersability in aqueous systems.

The embodiments of the invention in which an exclusive property or privilege is claimed are defined as follows:

1. A method of removing bitter flavour and pea flavour from a pea flour for addition to food systems comprising the steps of contacting the flour with moist steam for a time duration sufficient only to debitter the pea flour and volatilize pea flavour components and then leading off the steam and volatilized pea flavour components before a substantial cooked pea flavour develops in the flour.

2. A method of removing bitter flavour and pea flavour from a pea flour as claimed in claim 1 wherein the pea flour is in the form of a dry flour.

3. A method of removing bitter flavour and pea flavour from a pea flour as claimed in claim 1 wherein the pea flour is formed into a slurry.

4. A method of removing bitter flavour and pea flavour from a pea flour as claimed in claim 2 wherein the nitrogen solubility index of said pea flour is reduced by contacting the pea flour with said steam to a value of between 50 and 70.

5. A method of removing bitter flavour and pea flavour from a pea flour as claimed in claim 3 wherein by contacting the pea flour with said steam causes the temperature of said slurry to rise above 100° C.

6. A method of removing bitter flavour and pea flavour from a pea flour as claimed in claim 3 wherein by contacting the pea flour with said steam causes the temperature of said slurry to reach at least 120° C.

7. A method of removing bitter flavour and pea flavour from a pea flour as claimed in claim 3 wherein by contacting the pea flour with said steam causes the temperature of said slurry to reach at least 150° C.

* * * * *